(12) United States Patent
Quinn et al.

(10) Patent No.: US 11,288,070 B2
(45) Date of Patent: Mar. 29, 2022

(54) OPTIMIZATION OF LOW-LEVEL MEMORY OPERATIONS IN A NUMA ENVIRONMENT

(71) Applicant: International Business Machines Corporation, Armonk, NY (US)

(72) Inventors: William F. Quinn, Austin, TX (US); Anil Kalavakolanu, Austin, TX (US); Douglas Griffith, Burnet, TX (US); Sreenivas Makineedi, Round Rock, TX (US); Mathew Accapadi, Cedar Park, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 88 days.

(21) Appl. No.: 16/673,400

(22) Filed: Nov. 4, 2019

(65) Prior Publication Data
US 2021/0132944 A1    May 6, 2021

(51) Int. Cl.
*G06F 9/30* (2018.01)
*G06F 9/50* (2006.01)
(Continued)

(52) U.S. Cl.
CPC .......... *G06F 9/3004* (2013.01); *G06F 9/4856* (2013.01); *G06F 9/5016* (2013.01);
(Continued)

(58) Field of Classification Search
CPC .. G06F 9/3004; G06F 9/5016; G06F 11/3037; G06F 9/4856; G06F 12/023; G06F 2212/2542

See application file for complete search history.

(56) References Cited

U.S. PATENT DOCUMENTS

| 5,293,491 A | 3/1994 | Leung et al. |
| 9,361,031 B2 | 6/2016 | Busaba et al. |

(Continued)

FOREIGN PATENT DOCUMENTS

JP    H11203261 A    7/1999

OTHER PUBLICATIONS

Gamsa et al., Tornado: Maximizing Locality and Concurrency in a Shared Memory Multiprocessor Operating System, Proceedings of the 3rd Symposium on Operating Systems Design and Implementation, Feb. 1999, vol. 99, pp. 87-100, New Orleans, Louisiana.

*Primary Examiner* — Sisley N Kim
(74) *Attorney, Agent, or Firm* — Garg Law Firm, PLLC; Rakesh Garg; Nathan Rau

(57) ABSTRACT

A method for optimization of low-level memory operations in a distributed memory storage configuration that includes receiving, at a first processor, a request to migrate data from the first processor to a second processor, where the first processor and the second processor comprise a processor and memory, and identifying a command instruction associated with the requested data. The method also includes comparing a first performance metric associated with the first processor to a second performance metric associated with the second processor, where the first performance metric and the second performance metric are associated with executing the command instruction, and where, based on the comparing, a decision to move the command instruction to the second processor is formed, and migrating, responsive to the decision, the data and the command instruction to the second processor.

18 Claims, 5 Drawing Sheets

(51) Int. Cl.
*G06F 12/02* (2006.01)
*G06F 11/30* (2006.01)
*G06F 9/48* (2006.01)

(52) U.S. Cl.
CPC ........ *G06F 11/3037* (2013.01); *G06F 12/023* (2013.01); *G06F 2212/2542* (2013.01)

(56) References Cited

U.S. PATENT DOCUMENTS

| | | |
|---|---|---|
| 9,934,154 B2 | 4/2018 | Malladi et al. |
| 2012/0110244 A1 | 5/2012 | Feeley et al. |
| 2015/0254088 A1 | 9/2015 | Chou et al. |
| 2016/0212061 A1* | 7/2016 | Birkestrand ............ H04L 67/10 |
| 2016/0299839 A1 | 10/2016 | Biewer et al. |
| 2017/0371777 A1* | 12/2017 | Kim ...................... G06F 9/5016 |
| 2018/0024749 A1 | 1/2018 | Ohta et al. |
| 2019/0018705 A1* | 1/2019 | Gutierrez ................ G06F 12/08 |
| 2019/0171460 A1* | 6/2019 | Folco .................. G06F 9/30145 |
| 2021/0026707 A1* | 1/2021 | Rosenberg ............ G06F 9/5088 |

* cited by examiner

OPTIMIZATION OF LOW-LEVEL MEMORY OPERATIONS IN A NUMA ENVIRONMENT

TECHNICAL FIELD

The present invention relates generally to a method, computer program product, and system in the field of computer memory management. More particularly, the present invention relates to a method, computer program product, and system for optimization of low-level memory operations in a non-uniform memory access environment.

BACKGROUND

In computing environments, computer processor units (CPUs or processors), and computing elements with processing cores consume time moving blocks of data from one memory location to another or filling a block of memory with a value (usually 0's). This movement, also referred to as setting or migration of data, is often necessary prior to the execution of an application residing within the CPU. Typically, a call is made to some low level memory operation, e.g. memcpy or memset, from one processor and it performs the requested operation in-line on the caller's CPU. In Non-Uniform Memory Access (NUMA) systems, these copy or filling operations often involve a significant time penalty when the memory is not located in the same module as the CPU performing the copy or fill operation.

In some embodiments, one or more processors are located with memory in a module or node. A NUMA system typically includes multiple computer nodes or processors connected by several high-speed inter-connections. The collection of nodes computer is typically a single piece of hardware and has a single operating system image. The operating system image runs on multiple processors within the system. The processors can be located within multiple integrated circuit (IC) chips, and the IC chips can be positioned on multiple CPU cards in different slots within the system. The location of memory relative to the CPU determines the type of memory used. e.g. near, far, or distant.

Typically, a processor core is associated with several types of memory including near, far, and distant memory. Near memory is dedicated to a single processor core and are directly connected to that processor. Far memory is that memory directly connected to a different processor but located on the same CPU card, while distant memory is dedicated to a different processor positioned in a different enclosure or CPU card but still located within the same system. In many instances, access to near memory takes less time that accessing far memory or distant memory.

According to some embodiments, data is located in far memory or distant memory and is used by a different processor if a near processor is busy or otherwise unavailable or unsuitable for a particular use. In some embodiments, processors and memory locations are selected based on available data storage size and speed and the time delay required to access the data in far memory or distant memory.

The present disclosure is associated with low-level memory operations and thread management within a single computer system. In the present environment, copying of data from one location to another or filling the memory with some value takes a finite amount of time, or latency depending on whether the memory location is near, far, or distant memory relative to the CPU performing the operation. The act of accessing data from far or distant memory locations is time-consuming, uses power produces heat, and introduces latency between the initial command and the complete execution of that command. In some embodiments, latency is measured in cycles per instruction, seconds, or in a number of clock cycles to complete the access.

SUMMARY

The illustrative embodiments provide a method, computer program product, and system. An embodiment includes a method for optimization of low-level memory operations in a distributed memory storage configuration within a single computer system that includes receiving, at a first processor, a request to migrate data from the first processor to a second processor, where the first processor and the second processor comprise a processor and memory, and identifying a command instruction associated with the requested data. The method also includes comparing a first performance metric associated with the first processor to a second performance metric associated with the second processor, where the first performance metric and the second performance metric are associated with executing the command instruction, and where, based on the comparing, a decision to move the command instruction to the second processor is formed, and migrating, responsive to the decision, the data and the command instruction to the second processor.

An embodiment includes a computer usable program product. The computer usable program product includes one or more computer-readable storage devices and program instructions stored in a subset of a set of storage devices, the stored program instructions includes program instructions to receive, at a first processor, a request to migrate data from the first processor to a second processor, where the first processor and the second processor are in a single computer node and have a processor and memory, program instructions to identify a command instruction associated with the requested data, and program instructions to compare a first performance metric associated with the first processor to a second performance metric associated with the second processor, where the first performance metric and the second performance metric are associated with executing the command instruction, and where, based on the comparing, a decision to move the command instruction to the second processor is formed. The computer usable program also includes program instructions to migrate, responsive to the decision, the data and the command instruction to the second processor.

An embodiment includes a system. The system includes a processor, a computer-readable memory, a computer-readable storage device, and program instructions stored on the storage device for execution by the processor via the memory, the stored program instructions made of program instructions to receive, at a first processor, a request to migrate data from the first processor to a second processor, where the first processor and the second processor are in a single computer node and comprise a processor and memory, program instructions to identify a command instruction associated with the requested data, and program instructions to compare a first performance metric associated with the first processor to a second performance metric associated with the second processor, where the first performance metric and the second performance metric are associated with executing the command instruction, and where, based on the comparing, a decision to move the command instruction to the second processor is formed. The stored program instructions also include program instructions to migrate, responsive to the decision, the data and the command instruction to the second processor.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
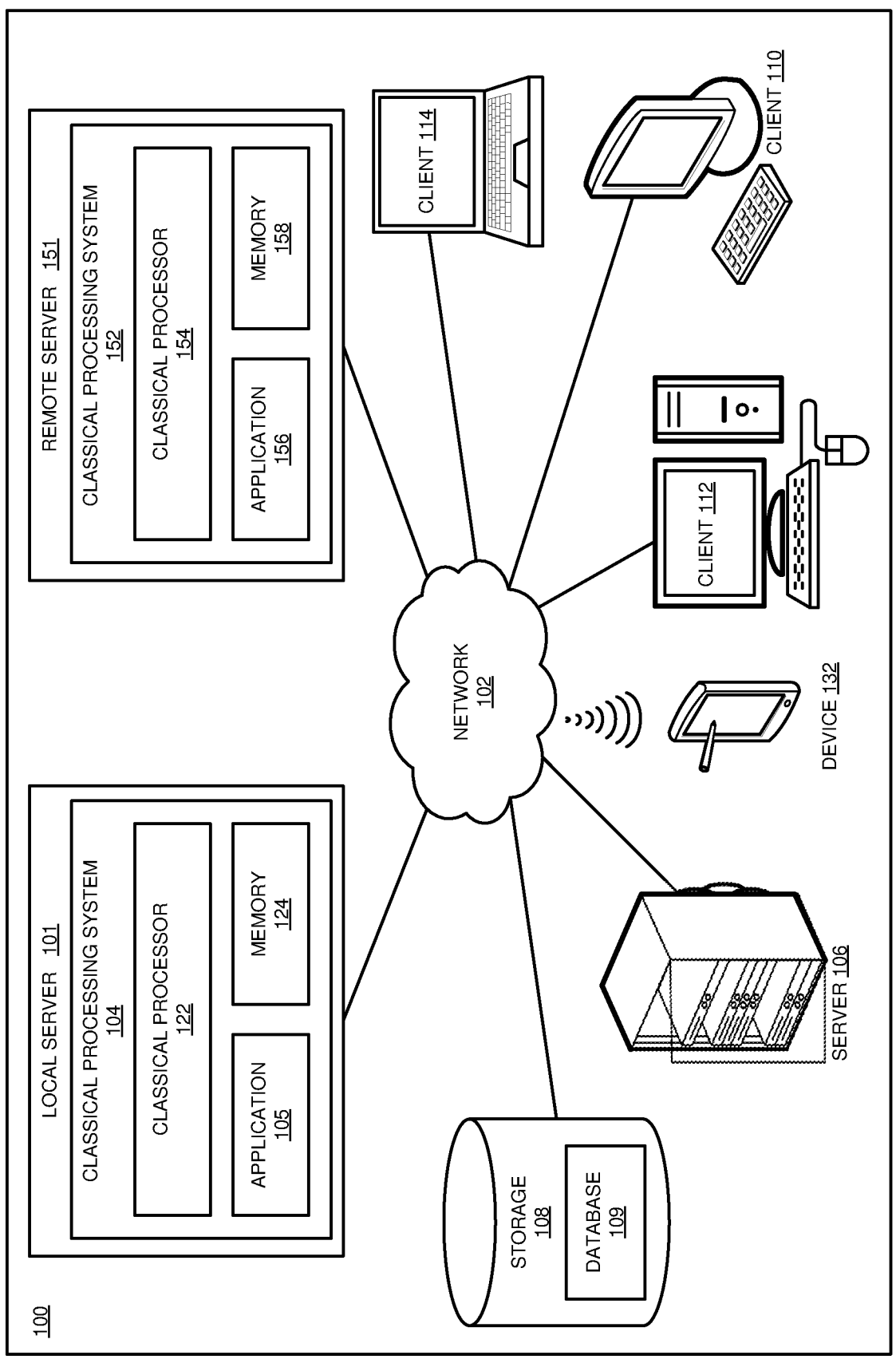
FIG. 1 depicts a block diagram of a network of data processing systems in accordance with an illustrative embodiment.

The illustrative embodiments recognize that there is a need to enhance the performance of a distributed memory storage configuration during processing operations. In many instances, the memory storage takes the form of server farms, computer nodes, remote storage systems, processing centers, server clusters, and the like. In the present embodiments, all processors and CPU cards are located within a single computer node. Often, each server includes many processors and processor cores, along with one or more localized memory elements associated with each processor. In the present disclosure, each local processor is associated with a near memory element, and a remote processor is associated with either a far or distant memory element. In one example, a local server with a processor core and a memory element receives a memory call or command instruction to transfer a volume of data from a near memory location to a distant memory location. In some embodiments, a server that receives a command to transfer data determines the destination distant memory location and transfers the data regardless if there are processors and memory that can migrate the data and execute the command in less time.

According to some embodiments, it is more efficient to move the calling program or command instruction to a remote processor where the data currently resides in memory local to that processor rather than moving the data in far or distant memory to the calling processor. In some embodiments, database applications using an operating system such as UNIX® often call subroutines such as "bzero", "bcmp", bcopy", or "memset" on data in memory in an effort to identify alternative target memory locations. If the memory is not local to the calling processor, the resulting transfer of data from near memory to far or distant memory results in increased latency.

Low-level service is associated with rudimentary microfunctions of a processor such as systems software while high level service is associated with macro-type and complex processes such as end-user applications. Low-level service is typically concerned with individual components within the system and how they operate. In contrast, high-level service is related to functions across a server or servers and includes how multiple processors access and manipulate data. As disclosed herein, some embodiments have the operating system running on the processor that includes a low-level service to determine an alternate memory location (in terms of lower latency) to enable efficient execution of commands.

The illustrative embodiments recognize that when the operating system, running on the processor, has access to a low-level service and determines that the memory is local, a more efficient operation is capable of being performed. In one example, the processor receives a call to migrate data to far or distant memory while the command instruction is to be executed by a local processor. In such an instance, the processor determines that executing such a command instruction would use fewer clock cycles to either keep the data in near memory and execute the command instruction locally, or to migrate both the data and the command instruction to another processor for execution there. Thus, the processor takes into consideration the latency of both alternatives (keeping the data in near memory verses migrating both the data and the command instruction to another processor).

In some embodiments, the processor also considers additional factors including the availability of the far or distant memory and remote processor, the size of the data being migrated, memory affinity (a parameter summarizing accessible memory available to the processor), processor performance, processor utilization rates, and the like. In another example, the processor receives a command to migrate data to a different processor. However, the processor determines that the different processor is at 95% utilization. Meanwhile, the local processor is running at 10% utilization. The processor then decided to keep both the data and the command instruction in the local server so that the local processor can execute the command instruction.

According to some embodiments, migration of memory calls is preferable when the number of CPU cycles per instruction, or the total number of CPU cycles can be reduced if the thread of execution can be moved to a different CPU where the memory has the fastest access times (or smallest latency). In some embodiments, local memory is the best choice, with near memory the next best choice, and far and distant memory the last choices based on CPU cycles per instruction measurements.

In some embodiments, the processor tracks how the CPU and memory of each processor core is organized based in part on the hardware configuration, location, and design. However, the methods and processes disclosed herein are centralized around the concept that a kernel function interfaces with the lower level hypervisor or hardware nicrocode. The design and organization of memory and CPU is based on the hardware. There can be a different number of CPUs, and the hardware design can be complex. In one example, a processor circuit card has 12 cores, with each core acting as a virtual CPU, and each virtual CPU having 8 logical CPUs. Therefore, in this example, one processor circuit card represents 96 CPUs.

Continuing with the example, each processor or chip can be on a different card or planar board. Each chip can have a different number of cores. Each core is connected through cache and memory controllers to memory DIMMs. The total amount of memory installed is important, as when higher capacity DIMMs are used, there will be more memory local to a core. When a smaller total amount of memory is configured with many cores, then less memory will be local to a specific CPU. So, the method and process to migrate memory is based on part on:

1) The memory operation (move, copy, set, zero);
2) The size of the memory being acted on;
3) The locality of the memory to the CPU the thread is running on (e.g., local, near, far, distant);
4) The total number of cycles to complete a relocation operation based on the hardware; and
5) The savings in latency that would be seen if moving the execution thread to a different CPU.

In operation, migrating memory data includes having the low level memory command calling a "switch CPU" command to move the thread of execution to a different CPU. All related stacks, data structures, cache lines, and the like will be consolidated on the new CPU. Each time the low level memory operation is called, the decision is made in part on where the thread is executing and the location of the memory being acted on. The thread can repeat low level memory calls on certain ranges of memory that it manages itself. The application can also allocate a pool of memory that is used in repeated operations. In some embodiments, this memory pool can be of a fixed size or it can grow and shrink as needed. Also in some embodiments, the total number of cycles per instruction that are consumed acting on the memory will be greater than the cycles per instruction used to move the thread of execution to a CPU where the memory is local.

The illustrative embodiments are described with respect to processors, memory elements, computer nodes, servers, data storage units, subjects, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. According to some embodiments, data processing environment 100 resides on a single computer node.

Clients or servers are only example roles of certain data processing systems connected to network 102 and are not intended to exclude other configurations or roles for these data processing systems. Data processing environment 100 includes local server 101 and remote server 151. Local server 101 and remote server 151 couples to network 102 along with storage unit 108. Software applications may execute on any computer in data processing environment 100. Clients 110, 112, and 114 are also coupled to network 102. A data processing system, such as local server 101, 106, or 151, or client 110, 112, or 114 may contain data and may have software applications or software tools executing thereon.

Local server 101 includes classical processing system 104 that has classical processor (local processor) 122, memory (near memory) 124, and runs application 105 as described herein. Likewise, remote server 152 includes classical processor (remote processor) 154, distant memory 158, and runs application 156. In some embodiments, application 105 is the same software as application 156, while in other embodiments, the applications 105, 156 are different. According to some embodiments, local server 101 and remote server 152 utilize similar or identical hardware, components, operating system, and the like. In other embodiments, local server 101 and remote server 151 use different hardware, operating systems, and the like and are physically isolated form one another.

Only as an example, and without implying any limitation to such architecture, FIG. 1 depicts certain components that are usable in an example implementation of an embodiment. For example, servers 101, 106, 151 and clients 110, 112, 114 are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 101, 106, 110, 112, 114, and 151 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 101, 106, and 151, storage unit 108, clients 110, 112, and 114, and device 132 may couple to network 102 using wired connections, wireless communication protocols, or other suitable data connectivity. Clients 110, 112, and 114 may be, for example, personal computers or network computers.

In the depicted example, servers 101 and 151 may provide data, such as boot files, operating system images, and applications to clients 110, 112, and 114. Clients 110, 112, and 114 may be clients to servers 101 and 151 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

Figure 2:
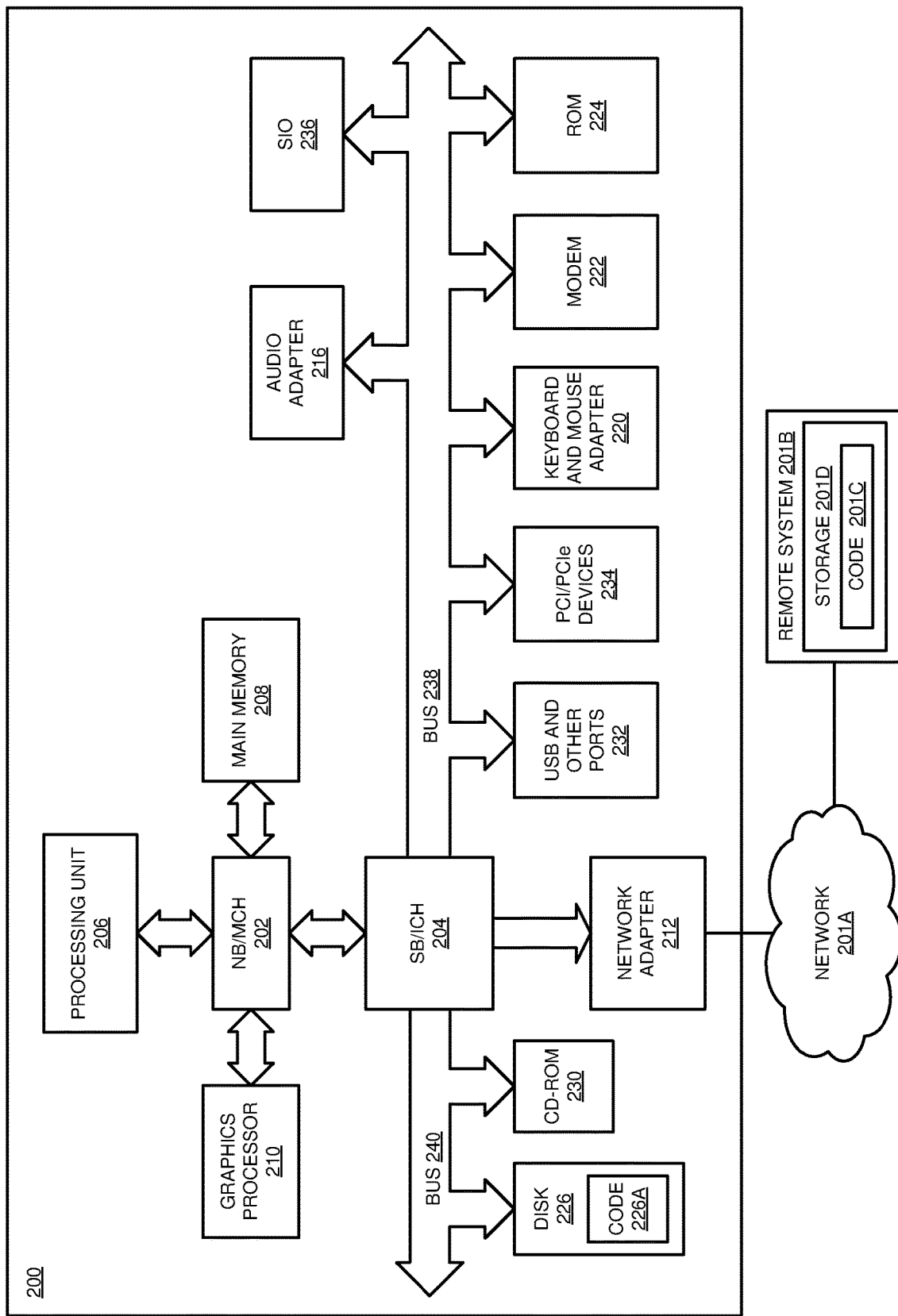
FIG. 2 depicts a block diagram of a data processing system in accordance with an illustrative embodiment.

With reference to FIG. 2, this figure depicts a block diagram of a data processing system in which illustrative embodiments may be implemented. Data processing system 200 is an example of a computer, such as servers 101, 106, and 151, or clients 110, 112, and 114 in FIG. 1, or another type of device in which computer usable program code or instructions implementing the processes may be located for the illustrative embodiments.

Data processing system 200 is also representative of a data processing system or a configuration therein, such as servers 101, 151 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An artifact oriented or other type of programming system may operate in conjunction with the operating system and provide calls to the operating system from programs or applications executing on data processing system 200.

Instructions for the operating system, the artifact-oriented programming system, and applications or programs, such as applications 105, 156 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
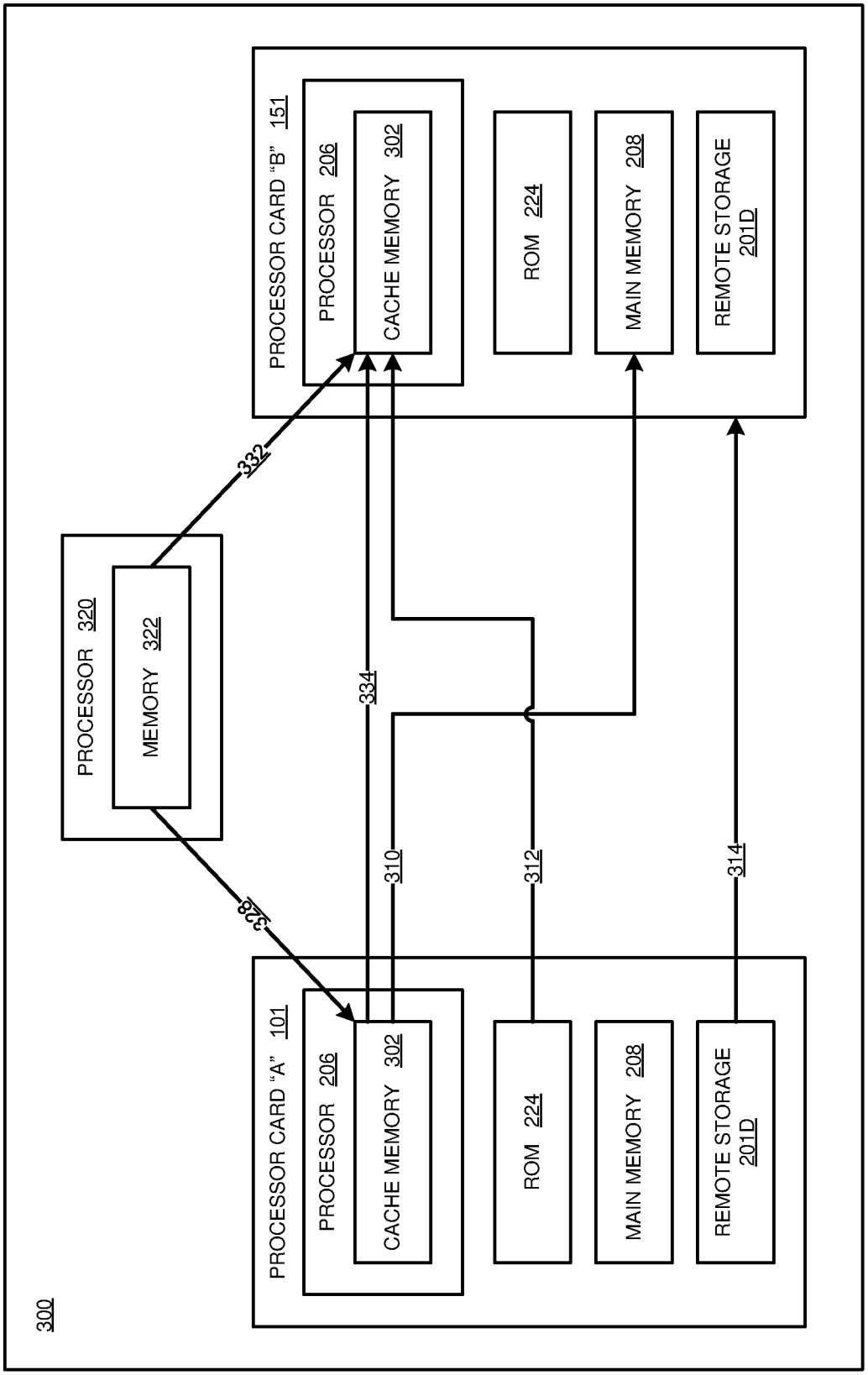
FIG. 3 depicts a block diagram of an example processor array within a single computer node, with each processor having a near memory area in accordance with an illustrative embodiment.

With reference to FIG. 3, this figure depicts a block diagram of an example server array 300 within a single computer node, with local server 101, remote example processor array 300 within a single computer node, with each processor having a near memory area in accordance with an illustrative embodiment of FIG. 1. According to some embodiments, local server 101 and remote server 151 are located on separate IC cards within a single computer node. In some embodiments, the server array 300 includes a number of local servers 101 and remote servers 151. In some embodiments, the processor array 300 is located on a server, such as local server 101. According to some embodiments, the local server 101 and the remote server 151 include a processor 206 and near memory, such as memory 124 of FIG. 1, in accordance with an illustrative embodiment. According to some embodiments, near memory 124 is present in the form of cache memory 302, ROM 224, main memory 208, and remote storage 201D as described herein.

Each server 101, 151 communicates with the other servers 101, 151 via a network or bus 238 of FIG. 2. Command instructions and data are moved, or migrated, between the servers 101, 151, and the processor array 300. The servers 101, 151 include one or more processors, multiple processor cores, virtual machines, and the like and are logically organized based on a similar location, function, operating system, hardware type, and the like. In many instances, each individual processor 206 is associated with a cache memory 302 and other memory, such as ROM 224, main memory 208, and remote storage 201D.

The present disclosure includes migrating command instructions and data between servers 101, 151 and the processor array 300. Processor array 300 includes a processor 320 and memory 322. Memory 322 can be cache memory, ROM, main memory, or remote storage memory as described herein. In some embodiments, processor array 300 sends command instructions to local server 101 across the bus 238 of FIG. 2. Once the command instructions are sent, the receiving local server 101 executes those command instructions by either processing the instructions locally or by migrating the command instructions and data to another server, such as remote server 151. According to some embodiments, the processor array 300 migrates separate portions of the command instructions and data to multiple remote servers 151, or to the local server 101 and a remote server 151. Communication between servers 101, 151 are via the bus 238 which is monitored and controlled by the processor array 300 running an operating system such as UNIX®. Other embodiments are possible and are not limited by these examples.

In operation, local server 101 receives a command instruction from a calling processor, for example processor 320 of the processor array 300. The command instruction 328 instructs the local processor 206 of local server 101 to migrate data 310 located in cache memory 302 to the main memory 208 of remote server 151 for execution by remote server 151 processor 206. Local processor 206 of local server 101 sends the migrated data 310 to main memory 208 of remote server 151.

In another example, processor array 300 migrates a command instruction 332 from memory 322 to the cache memory 302 of remote server 151. In this manner, migrated data and command instructions moves from near memory to distant memory and from distant memory to near memory. In another example, processor array 300 migrates a command instruction 332 to the cache memory 302 of remote server 151. The processor array 300 also directs data 312 in local server 101 ROM memory 224 to migrate to cache memory 302 of the remote server 151. In another example, local server 101 is commanded by the processor array 300 to migrate data 314 from remote storage 201D to remote storage 201D of remote server 151.

Figure 4:
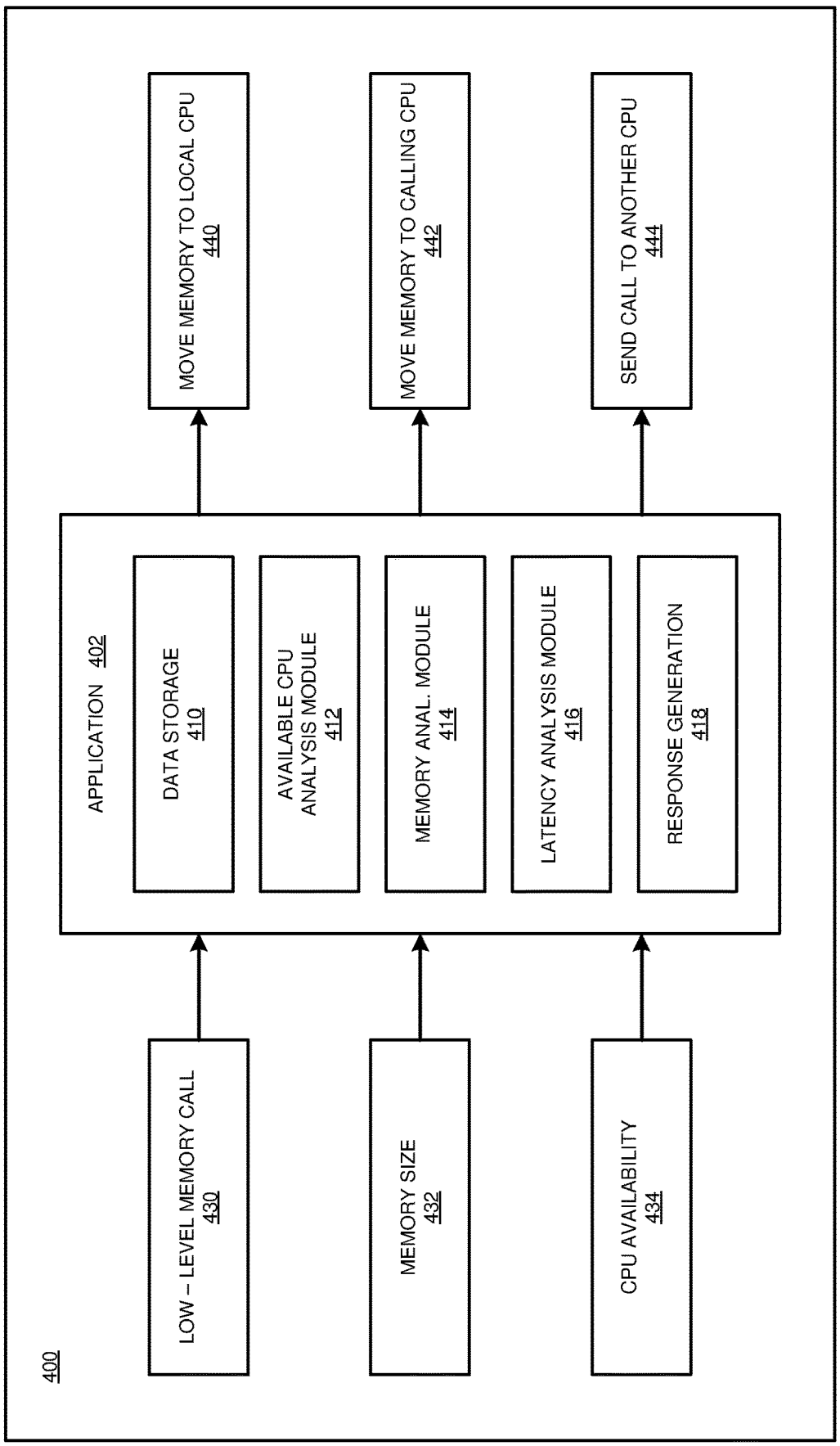
FIG. 4 depicts a functional diagram of an example application for optimization of low-level memory operations in accordance with an illustrative embodiment.

With reference to FIG. 4, this figure depicts an example functional diagram of an example application system 400 for optimization of low-level memory operations in accordance with an illustrative embodiment. Application system 400 includes a software application 402 running on a computer, such as local server 101 of FIG. 1. Application 402 includes several functional modules associated with memory data migration as disclosed herein. Data storage module 410 reads and writes data to and from near memory, far memory, and distant memory such as memory 124 of servers 101, 151. The data storage module 410 also determines the amount or size of memory requested for a particular command. As an example, one command requests 32 bytes of data, while another command requests 64 Mbytes of data to be stored in memory.

The application system 400 also includes several input signals, including a low-level memory call 430. The memory call 430 is a command from processor array 300 that instructs the local processor 122 to send data presently stored in near memory 124 to a far or distant memory 158 associated with a remote processor 151. In at least some embodiments, the memory call 430 arrives from a remote server 151 via bus 238 as disclosed herein. The application system 400 also includes health and status signals pertaining to each server 101, 151, including health and status of each associated processor 122, 152 and memory 124, 158. These health and status signals include a memory size signal 432 and a processor (CPU) availability signal 434. One or both of these health and status signals are used by the application 402 to determine whether to migrate data to a far or distant memory or to retain the data in near memory.

The application system 400 also includes several output signals, including a migrate memory data command signal 440, where the application 402 sends a command to a remote server 151 to migrate data in far or distant memory 158 to near memory 124 for processing by the local processor 122. Similarly, the application system 400 includes a command to a calling processor signal 442 to migrate data stored in near memory 124 to far or distant memory 158. The application system 400 also includes a send command signal 444 to send the command call itself to remote processor 154 for execution there.

Next, application 402 includes an available CPU analysis module 412 which communicates with the processor array 300 and maintains a register of the status of each processor in the data processing system 100, such as processor 122 in each server 101, 151 in the server array 300 of FIG. 3. The CPU analysis module 412 characterizes each processor as active, in standby, available, out of service, and the like. In addition, the CPU analysis module 412 maintains a record of the performance of each processor as part of a health and status check. Next, application 402 includes a memory analysis module 414 which communicates with other servers 101, 151 and maintains a record on the health and status of memory associated with each server 101, 151.

Continuing with FIG. 4, application 402 includes a cycles per instruction or latency analysis module 416. The latency analysis module 416 maintains a record of the estimated time required for each processor and memory to complete commands. According to some embodiments, the time required (latency) is measured in cycles per instruction, while in other embodiments, the latency is measured in cycles per second or in milliseconds. Next, the application 402 includes a response generator 418 for deciding whether to migrate data to another memory and to choose which available processor/memory pair is the preferred destination. In at least some embodiments, the response generator 418 chooses to not migrate data at all and instead retains data locally for execution by the local processor 122.

In operation, application 402 determines whether the intended memory target requires local, far, or distant memory access. Next, the application 402 determines the memory size required to execute the command by using the memory size signal 432 sent by each memory location in the system. Next, the application 402 determines, by the size of the intended memory location and the memory location itself, whether to utilize an already-existing low-level system command such as switch_cpu( ) in dispatch code to move the contents of the memory. As an example, if the amount of memory being set by a "bzero" or "memset" command is below a size threshold, the latency values involved may be sufficiently small enough to execute the command on whatever processor it is currently residing on rather than using memory migration to another memory location.

According to some embodiments, the processor array 300 compares the latency associated with one server as compared to the latency associated with another server to determine the most optimal server. Once chosen, the selected server 101, 151 and the associated processor 122, 154 and memory 124, 158 will receive a command call 422, 444 to execute the command. Also in some embodiments, the processor array 300 divides up portions of the command call 422, 444 to enable portions of the command call 422, 444 to be executed at one server 101, 151 while portions of the command are executed at another server 101, 151. According to some embodiments, a performance metric that is used to select a target server is associated with memory affinity. According to some embodiments, the performance metric is associated with a minimum memory size exceeding a threshold value, with a candidate memory location not eligible for selection if the memory size is too small to handle the request.

Figure 5:
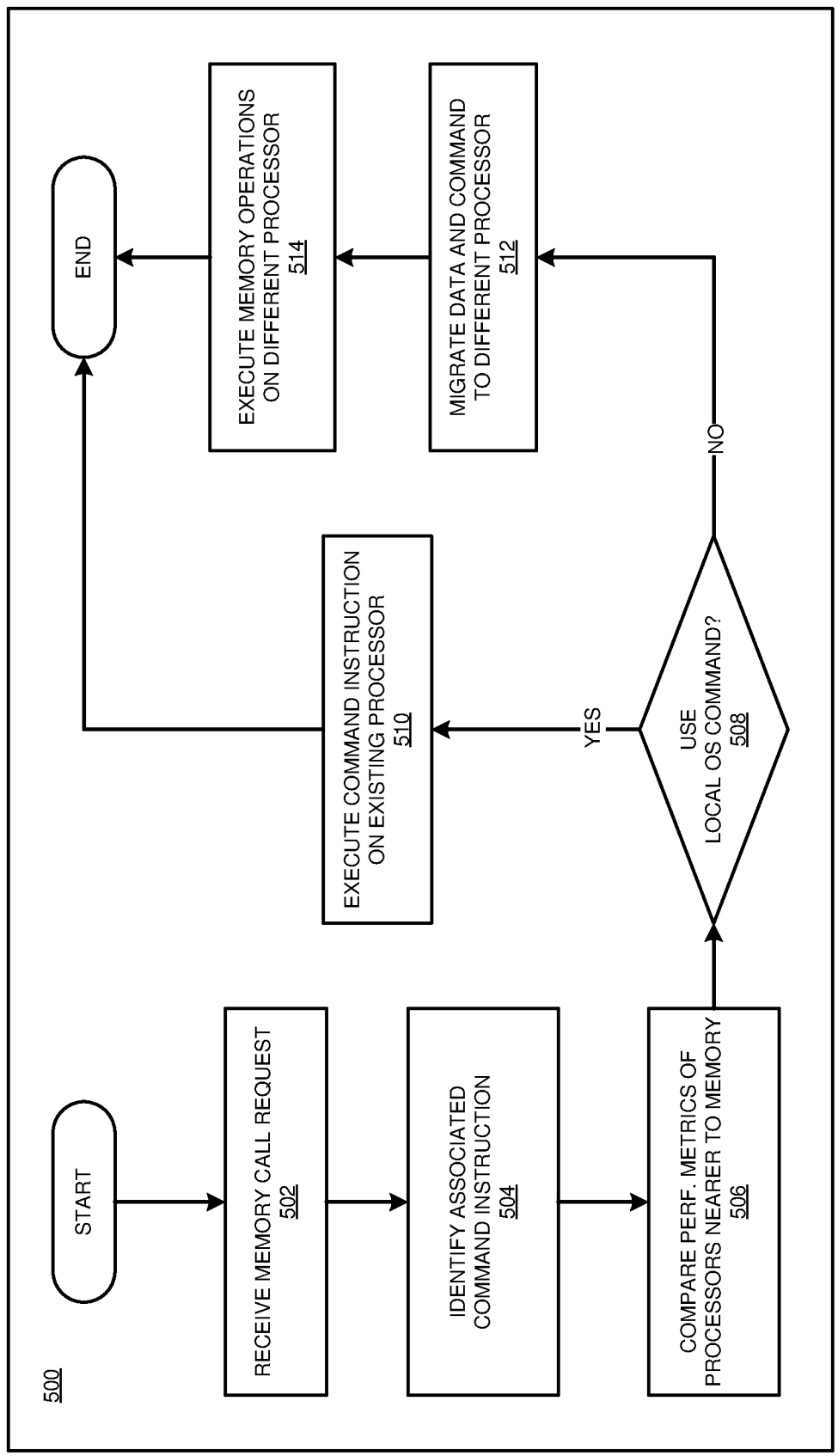
FIG. 5 depicts a flowchart of an example optimization of low-level memory operations between multiple processors in accordance with an illustrative embodiment.

With reference to FIG. 5, this figure depicts a flowchart 500 of an example optimization of low-level memory operations between multiple servers in accordance with an illustrative embodiment. At block 502, a server, such as local server 101 of FIG. 3, receives a command from processor array 300 to send data stored in near memory 124 to far or distant memory 158. Next, at block 504, the application, such as application 402 of FIG. 4, uses the health and status signals to form a register of available memory locations eligible to receive data associated with the memory migration. Next, at block 506, the application 402 determines the size of the data to be migrated.

Next, at decision block 508, the application 402 decided whether to follow through on the original command for memory migration, or to redirect the command to a different server that is associated with a better performance metric, such as availability or lower latency. The application 402 identifies each available server in the server array 300 based at least in part on the performance metrics, including but not limited to server availability, server latency rates, memory affinity, memory area size, processor availability, and the like. At decision block 508, if the application 402 determines that a remote server is a better candidate to execute the command call, the application 402 will generate a new command call, such as command call signal 442 and sends it to the remote server 151 for execution.

According to some embodiments, if the application 402 decides at decision block 508 ("YES") to not migrate the memory call command, the application, at block 510, executes the memory call locally by keeping the call in the local processor 104 and using the near memory 124. Otherwise, if the application 402 decides, at decision block 508, to send the memory call to far or distant memory ("NO"), the application 402, at block 512, directs a different server to accept the data and execute the command. Next, at block 514, the application 402 sends the command response to far or distant memory 158 for execution by the remote processor 154.

Thus, a computer implemented method, computer program product, and system are provided in the illustrative embodiments for low-level optimization of low-level memory operations and other related features, functions, or operations. Where an embodiment or a portion thereof is described with respect to a type of device, the computer implemented method, computer implemented program product, or system, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or artifact code written in any combination of one or more programming languages, including an artifact oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for optimization of low-level memory operations in a distributed memory storage configuration within a single computer node, the method comprising:
    configuring a memory system with a first processor and a second processor, wherein the first processor comprises a first processing unit and a first memory, and the second processor comprises a second processing unit and a second memory, wherein the first memory is a first near memory relative to the first processing unit, the second memory is a second near memory relative to the second processing unit;
    receiving, at a first processor, a command instruction to be processed by the first processor;
    determining that processing the command instruction at the first processor requires migrating data from the first near memory to the second near memory;
    deciding, by comparing a first performance metric associated with the first processor to a second performance metric associated with the second processor, that the second memory is a far memory relative to the first processing unit, and wherein accessing the far memory by the first processing unit has a larger latency as compared to accessing the first near memory, wherein the first performance metric and the second performance metric each comprise a count of a number of cycles per instruction to execute the command instruction, a processor utilization rate, a locality of the data relative to an execution location of a thread using the data, and the command instruction, and wherein, based on the comparing, a decision to move the command instruction to the second processor is formed; and
    migrating, responsive to the deciding and instead of migrating the data from the first near memory to the second near memory, the command instruction to the second processor.

2. The method of claim 1, wherein the first performance metric and the second performance metric are associated with a latency period for executing the command instruction.

3. The method of claim 1, wherein the first performance metric and the second performance metric are associated with a memory area size required to execute the command instruction.

4. The method of claim 1, wherein the first performance metric and the second performance metric are associated with memory affinity, wherein memory affinity is a parameter associated with accessible memory available to a processor.

5. The method of claim 1, wherein the first performance metric and the second performance metric are associated with a minimum memory size exceeding a threshold value.

6. The method of claim 1, further comprising:
    identifying a third performance metric associated with a third processor, wherein the third performance metric is associated with executing the command instruction;
    comparing the first performance metric to the second performance metric and the third performance metric, wherein, based on the comparing, a decision to move portions of the command instruction to the third processor is formed; and
    migrating, responsive to the decision, portions of the data and the command instruction to the third processor.

7. A computer usable program product comprising one or more computer-readable storage medium and program instructions stored in a subset of a set of storage devices, the stored program instructions comprising:
    program instructions to configure a memory system with a first processor and a second processor, wherein the first processor comprises a first processing unit and a first memory, and the second processor comprises a second processing unit and a second memory, wherein the first memory is a first near memory relative to the first processing unit, the second memory is a second near memory relative to the second processing unit;
    program instructions to receive, at a first processor, a command instruction to be processed by the first processor;
    program instructions to determine that processing the command instruction at the first processor requires migrating data from the first near memory to the second near memory;
    program instructions to decide, by comparing a first performance metric associated with the first processor to a second performance metric associated with the second processor, that the second memory is a far memory relative to the first processing unit, and wherein accessing the far memory by the first processing unit has a larger latency as compared to accessing the first near memory, wherein the first performance metric and the second performance metric each comprise a count of a number of cycles per instruction to execute the command instruction, a processor utilization rate, a locality of the data relative to an execution location of a thread using the data, and the command instruction, and wherein, based on the comparing, a decision to move the command instruction to the second processor is formed; and
    program instructions to migrate, responsive to the deciding and instead of migrating the data from the first near memory to the second near memory, the command instruction to the second processor.

8. The computer usable program product of claim 7, wherein the first performance metric and the second performance metric are associated with a latency period for executing the command instruction.

9. The computer usable program product of claim 7, wherein the first performance metric and the second performance metric are associated with a memory area size required to execute the command instruction.

10. The computer usable program product of claim 7, wherein the first performance metric and the second performance metric are associated with memory affinity, wherein memory affinity is a parameter associated with accessible memory available to a processor.

11. The computer usable program product of claim 7, wherein the first performance metric and the second performance metric are associated with a minimum memory size exceeding a threshold value.

12. The computer usable program product of claim 7, further comprising:
   program instructions to identify a third performance metric associated with a third processor, wherein the third performance metric is associated with executing the command instruction;
   program instructions to compare the first performance metric to the second performance metric and the third performance metric, wherein, based on the comparing, a decision to move portions of the command instruction to the third processor is formed; and
   program instructions to migrate, responsive to the decision, portions of the data and the command instruction to the third processor.

13. The computer usable program product of claim 7, wherein the stored program instructions are computer usable code stored in a computer readable storage device in a data processing system, and wherein the stored program instructions are transferred over a network from a remote data processing system.

14. The computer usable program product of claim 7, wherein the stored program instructions are computer usable code stored in a computer readable storage device in a server data processing system, and wherein the computer usable code is downloaded over a network to a remote data processing system for use in a computer readable storage device associated with the remote data processing system.

15. A system, comprising:
   a processor;
   a computer-readable memory;
   a computer-readable storage device; and
   program instructions stored on the storage device for execution by the processor via the memory, the stored program instructions comprising:
      program instructions to configure a memory system with a first processor and a second processor, wherein the first processor comprises a first processing unit and a first memory, and the second processor comprises a second processing unit and a second memory, wherein the first memory is a first near memory relative to the first processing unit, the second memory is a second near memory relative to the second processing unit;
      program instructions to receive, at a first processor, a command instruction to be processed by the first processor;
      program instructions to determine that processing the command instruction at the first processor requires migrating data from the first near memory to the second near memory;
      program instructions to decide, by comparing a first performance metric associated with the first processor to a second performance metric associated with the second processor, that the second memory is a far memory relative to the first processing unit, and wherein accessing the far memory by the first processing unit has a larger latency as compared to accessing the first near memory, wherein the first performance metric and the second performance metric each comprise a count of a number of cycles per instruction to execute the command instruction, a processor utilization rate, a locality of the data relative to an execution location of a thread using the data, and the command instruction, and wherein, based on the comparing, a decision to move the command instruction to the second processor is formed; and
      program instructions to migrate, responsive to the deciding and instead of migrating the data from the first near memory to the second near memory, the command instruction to the second processor.

16. The system of claim 15, wherein the first performance metric and the second performance metric are associated with a latency period for executing the command instruction.

17. The system of claim 15, wherein the first performance metric and the second performance metric are associated with a memory area size required to execute the command instruction.

18. The system of claim 15, further comprising:
   program instructions to identify a third performance metric associated with a third processor, wherein the third performance metric is associated with executing the command instruction;
   program instructions to compare the first performance metric to the second performance metric and the third performance metric, wherein, based on the comparing, a decision to move portions of the command instruction to the third processor is formed; and
   program instructions to migrate, responsive to the decision, portions of the data and the command instruction to the third processor.

* * * * *